United States Patent Office 3,174,954
Patented Mar. 23, 1965

3,174,954
PROCESS FOR PRODUCING ACRYLONITRILE POLYMERS USING CATALYST SYSTEMS OF HYDROXYLAMINE-N-SULFONATES AND TETRAVALENT SULFUR CONTAINING COMPOUNDS
Chozo Nakayama, Katsumi Shirode, Teiichi Kaku, Kazuo Jono, and Yoshihisa Fujimoto, all of Fuji-shi, Japan, assignors to Asahi Kasei Kogyo Kabushiki Kaisha, Osaka, Japan, a corporation of Japan
No Drawing. Filed Mar. 17, 1961, Ser. No. 96,360
Claims priority, application Japan, June 7, 1960, 35/26,649
5 Claims. (Cl. 260—85.5)

This invention relates to polymerization of acrylonitrile and, more particularly, to a new process for preparing polymers and copolymers of acrylonitrile.

Polymers of acrylonitrile and copolymers of acrylonitrile with other monoethylenically unsaturated compounds are known. These polymers and copolymers have found wide use in production of many valuable commercial products as, for example, synthetic rubbers and more recently, artificial fibers.

Difficulties have been encountered in the polymerization or copolymerization of acrylonitrile and considerable effort has been spent in the development of practical commercial process for preparing these extremely useful polymers and copolymers. We already have a number of reports relating to polymerization catalysts in an aqueous medium polymerization, and particularly a redox type catalyst consisting of oxidizing and reducing substances. The oxidizing substances include oxygen-yielding peroxides which have ability to initiate polymerization by themselves such as persulfate and perborate which is disclosed in U.S. Patent No. 2,436,926, or substances which have no ability to initiate polymerization by themselves such as chlorates, potassium permanganate or secondary metal salts. The reducing substances are oxidizable sulfoxy compounds and others. Generally speaking, the redox type polymerization catalyst is not a mere combination of any of oxidizing and reducing substances, but unique combination of the two sorts of substances.

Usefulness of a polymerization catalyst depends on physical and chemical properties of the produced polymer as well as ability to initiate polymerization. It is said to be desirable for the catalyst that polymers having superior physical properties and being suitable for articles desired are produced quickly with high yield.

We must take into consideration for such a catalyst kinds of radicals which initiate polymerization, amounts required for commercial polymerization rate, polymerization temperature, easiness to control the reaction system and the like, and particularly undesirable side-reactions caused when the catalytic system maintains its polymerization-initiating ability in commercially advantageous state.

It is an object of the present invention to provide a polymerization or copolymerization process of acrylonitrile in the presence of a novel catalyst.

It is another object of the present invention to provide a novel polymerization catalyst which is useful for preparing acrylonitrile polymer or copolymer. According to the present invention, the novel catalyst consists of an in-hydroxylamine-N-monosulfonate and -disulfonate and inorganic compounds having a tetravalent sulfur atom. The present catalyst has high polymerization-initiating ability and can produce polymers or copolymers having desired polymerization degree with easy control of the operation and being starting materials for acrylic, synthetic fibers, superior in both whiteness and heat stability of whiteness.

The hydroxylamine-N-sulfonic acids are hydroxylamine-N-monosulfonic acid of the formula

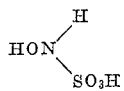

and hydroxylamine-N,N-disulfonic acid of the formula

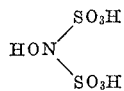

but the latter acid rapidly hydrolyzes in an aqueous solution of pH 1.5–4.0 into the monosulfonic acid and the two acids are equivalent in the present invention. Nitrilo sulfonic acid of the formula

does not initiate polymerization after it is mixed with tetravalent sulfur-containing inorganic compounds. Salts of such acids are sodium salts, potassium salts, ammonium salts and others and the former two are preferred because of good solubility.

Inorganic compounds having tetravalent sulfur atom are sulfur dioxide O=S=O, bisulfites

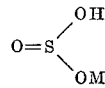

metabisulfites

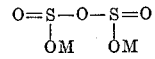

sulfites

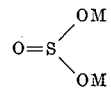

and hyposulfites

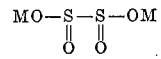

wherein M stands for monovalent metals. Thiosulfate which is one of the familiar oxidizable sulfoxy compounds is considered to have structural formula

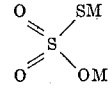

from its behavior and it is thus outside the scope of inorganic compounds having tetravalent sulfur atom, and we have found no activity for initiating polymerization after mixing thereof with the hydroxylamine-N- monosulfonate and -disulfonate. Organic compounds containing sulfur atom such as, for example, diethyl sulfite or toluene sulfinic acid show no commercially acceptable initiating activity.

As mentioned above, the present catalyst is composed of salts of hydroxylamine-N-monosulfonic acid or hydroxylamine-N,N-disulfonic acid and inorganic compounds containing tetra-valent sulfur atom. The former component may be used in amount of about 0.1–5.0% by weight of the total amount of monomer, for the hydroxylamine-N-monosulfonic acid salts, and the corresponding mol for the hydroxylamine-N,N-disulfonic acid salts. The latter components i.e. inorganic compounds containing tetravalent sulfur atom may be used within the range of from about 1 to about 10% by weight of the total amount of monomer. The ratio of the former component to the latter may be varied within the range of from about 5:1 to about 1:30 by weight. Generally speaking, amount of the polymerization catalyst may be varied depending on physical properties of the polymer, polymerization speed and other economical factors. The polymerization may be effected above 10° C., preferably at 40°–75° C. The polymerization may hardly be carried out at economical rate at below 10° C., while decomposition rate of the polymerization catalyst becomes too unnecessarily great to produce a desirable polymer at too high a temperature.

It is required for the present catalyst that the present polymerization is effected at pH of 1.5–4.0, otherwise polymerization initiating ability of the present catalyst is greatly reduced and finally disappears. In order to maintain such pH, inorganic or organic acids such as sulfuric acid, nitric acid, hydrochloric acid, oxalic acid and the like may be used.

The present polymerization is effected in an aqueous solution medium, and the monomeric material and water should be charged in a reactor with a ratio of about 1:2 to about 1:15 by weight. As the ratio of water to monomer is reduced, polymerization heat is hardly removed and the produced polymer slurry becomes too viscous; but the polymer may be produced in good yield, production capacity per unit volume of a reaction vessel increases and further less polymerization catalyst per unit weight of monomer may be required. Since produced polymer has excellent physical and chemical properties when the ratio is low, it is advantageous to determine the ratio taking consideration of views mentioned above.

The present polymerization may be effected, preferably, in the absence of oxygen, and therefore air in a reactor may be replaced by inert gases such as, for example, nitrogen before the polymerization starts. The oxygen reduces polymerization rate and impairs physical and chemical properties of the product polymer.

Heavy metals such as iron, copper and the like which are contaminants familiar in the polymerization system affect but little the polymerization reaction as well as physical properties of the final polymer. This is one of the advantages of the present process. When conventional catalysts such as ammonium persulfate-sodium bisulfite, or ammonium persulfate-thioglycollic acid were used, it will be seen from the following table that specific viscosity of the produced polymer is greatly affected by the presence of the heavy metals.

[Specific viscosity (D.M.F. 0.2 g./100 cc., 35° C.)]

| Metal ion, p.p.m. | The present catalytic system | Ammonium persulfate-sodium bisulfite | Ammonium persulfate-thioglycollic acid |
| --- | --- | --- | --- |
| Fe++: | | | |
| 0.1 | 1.58 | 1.55 | 1.25 |
| 1 | 1.61 | 1.24 | |
| 10 | 1.63 | 0.86 | |
| Fe+++: | | | |
| 1 | 1.58 | | 2.34 |
| 10 | 1.58 | | |
| Cu++: | | | |
| 1 | 1.56 | 1.47 | 2.10 |
| 10 | 1.54 | 1.15 | |

The above fact means that a reactor made of stainless steel may be used as well as a glass lined reactor. Dispersing agents and/or emulsifying agents may be present in the polymerization system.

The present invention may most favorably be applied to preparation of acrylonitrile polymers and copolymers but it may similarly be applied to the other ethylenically unsaturated compounds such as styrene, acrylic esters and methacrylic esters. The monoethylenically unsaturated compounds which may be copolymerized with acrylonitrile are acrylic acid, acrylic acid esters, acrylic acid amides, methacrylic acid, methacrylate, methacrylic acid amides, vinyl acetate, vinyl chloride, vinylidene chloride, itaconic acid, meta-allylsulfonic acid and para-styrene sulfonic acid.

The polymer or copolymer produced by the present process is very useful for acrylic synthetic fibers which have excellent physical properties. The polymer or copolymer may also be useful for film or other articles.

The present invention will be fully understood by the following examples. Parts of reactants are all referred to by weight, unless otherwise specifically indicated.

*Example 1*

| | Parts |
| --- | --- |
| Deionized water | 1300 |
| Acrylonitrile | 100 |
| Potassium hydroxylamine-N-monosulfonate | 1.5 |
| Sodium bisulfite | 3.8 |
| Sulfuric acid | 0.3 |

A mixture of the above ingredients was charged in a glass-lined, closed reactor equipped with a mechanical agitator and a jacket and then nitrogen was passed to drive air off. The temperature was maintained at 60° C. while stirring for 4 hours to produce a polymer slurry of pH 2.8. The slurry was taken out of the reactor and dehydrated immediately thereafter. The slurry was thoroughly washed with water, again dehydrated by a centrifugal hydroextractor, and dried at 50° C to produce white polymer. Yield: 85%. The specific viscosity of the polymer was 1.40 at 35° C, in 0.2 g./100 cc. of dimethylformamide. The polymer was dissolved at 0° C. in nitric acid (70% by weight) free from nitrous acid to obtain a 24 g./100 cc. solution and then extruded at the rate of 4 m./min. in an aqueous nitric acid (30% by weight) solution. The extruded fibers were washed with water, stretched 7.5 times in hot water of 100° C. and dried at 80° C. to produce fibers of the properties of

| | |
| --- | --- |
| Fineness | 2.95 |
| Tensile strength g./d | 3.75 |
| Elongation percent | 24 |

The fibers had good whiteness and thermal stability and were hardly coloured after wet heat treatment for 10 min. at 120° C.

*Example 2*

| | Parts |
| --- | --- |
| Deionized water | 900 |
| Acrylonitrile | 100 |
| Sodium hydroxylamine-N-monosulfonate | 0.8 |
| Sodium bisulfite | 1.5 |
| Sulfuric acid | 0.2 |

The above ingredients were charged continuously in a glass-lined reactor equipped with a jacket and a stirrer. The temperature was maintained at 55° C. and the feed was controlled so that average residence period of time was 6.5 hours. Polymer slurry continuously discharged from the reactor had pH of 2.7. The polymer slurry was treated as in Example 1 to recover white polymer with 80% yield. The specific viscosity of the polymer was 1.50 determined as in Example 1, and the fibers produced from the polymer had

| | |
| --- | --- |
| Fineness d | 2.70 |
| Tensile strength g.%d | 3.57 |
| Elongation percent | 25 |

It also had good whiteness and thermal stability.

*Example 3*

| | Parts |
| --- | --- |
| Deionized water | 1300 |
| Acrylonitrile | 93 |
| Methyl acrylate | 7 |
| Potassium hydroxylamine-N-monosulfonate | 1.0 |
| Sodium bisulfite | 6.8 |
| Sulfuric acid | 0.3 |

A mixture of the above ingredients was polymerized at 65° C. for 4 hours as in Example 1. Polymer slurry had pH of 2.8 and white polymer of specific viscosity of 1.54 was recovered with 87% yield. If the sulfuric acid ingredient was replaced by sodium hydroxide and the reaction was effected at pH 4.5, the reaction mixture became brown and no polymer was obtained at 65° C. for 10 hours.

Example 4

|  | Parts |
|---|---|
| Deionized water | 1200 |
| Acrylonitrile | 93 |
| Methyl acrylate | 7 |
| Sodium hydroxylamine-N-monosulfonate | 1.8 |
| Sodium bisulfite | 6.0 |
| Formic acid | 1.0 |

A mixture of the above ingredients was polymerized at 60° C. for 4 hours as in Example 1 and there was obtained polymer slurry of pH 2.5 from which white polymer of specific viscosity of 1.45 was recovered with 89% yield. When there was no sodium hyroxylamine-N-monosulfonate or no sodium bisulfite ingredient, polymer was obtained with less than 5% yield after polymerization at 60° C. for 10 hours.

Example 5

|  | Parts |
|---|---|
| Deionized water | 1300 |
| Acrylonitrile | 92.5 |
| Methyl acrylate | 7.5 |
| Sodium metaallylsulfonate | 0.5 |
| Ammonium hydroxylamine-N-monosulfonate | 1.5 |
| Sodium bisulfite | 6.0 |
| Sulfuric acid | 0.5 |

A mixture of the above ingredients was polymerized at 55° C. for 4 hours as in Example 1 and there was obtained polymer slurry of pH 2.4 from which white polymer of specific viscosity of 1.71 was recovered with 85% yield.

Example 6

|  | Parts |
|---|---|
| Deionized water | 900 |
| Acrylonitrile | 90.5 |
| Methyl acrylate | 9.0 |
| Sodium metaallylsulfonate | 0.5 |
| Sodium hydroxylamine-N-monosulfonate | 0.8 |
| Sodium bisulfite | 3.4 |
| Sulfuric acid | 0.2 |

A mixture of the above ingredients was continuously charged in a stainless steel reactor equipped with a stirrer and a jacket. The temperature was kept at 55° C. and average residence period of time for the reactants was controlled to 4 hours. Polymer slurry of pH 2.9 was continuously discharged from the reactor. The slurry was treated as in Example 1 to recover white polymer of specific viscosity of 1.41 with 75% yield. The polymer was dissolved at 0° C. in nitric acid of 70% by weight free from nitrous acid to obtain a 25 g./100 cc. solution which was extruded at 0° C. in an aqueous nitric acid solution (30% by weight) at a rate of 5 m./min. The fibers thus obtained were washed with water, stretched 8 times in hot water of 100° C. and dried at 80° C. to obtain fibers of

| Fineness | d | 2.75 |
|---|---|---|
| Tensile strength | g./d | 3.95 |
| Elongation | percent | 23 |

The fibers were dipped in an aqueous dye bath containing 0.25% by weight of Severon Green B at bath ratio of 40, temperature of 100° C. for one hour and absorbed 6.5% by weight of the dye per fiber weight. The fiber had high whiteness and was hardly coloured after wet heat treatment with 120° C. steam for 10 min.

Example 7

|  | Parts |
|---|---|
| Deionized water | 1300 |
| Acrylonitrile | 92 |
| Methyl methacrylate | 5.0 |
| Acrylic acid amide | 3.0 |
| Sodium hydroxlyamine-N-monosulfonate | 0.5 |
| Sodium bisulfite | 6.0 |
| Sulfuric acid | 0.4 |

A mixture of the above ingredients was polymerized at 70° C. for 4 hours as in Example 1 and there was obtained polymer slurry of pH 2.6 from which white polymer of specific viscosity of 1.35 was recovered with 87% yield.

Example 8

|  | Parts |
|---|---|
| Deionized water | 1300 |
| Acrylonitrile | 96 |
| Acrylic acid amide | 4.0 |
| Sodium hydroxylamine-N-monosulfonate | 2.0 |
| Sodium bisulfite | 4.6 |
| Sulfuric acid | 0.6 |

A mixture of the above ingredients was polymerized at 60° C. for 4 hours as in Example 1 and there was obtained polymer slurry of pH 2.4 from which white polymer of specific viscosity of 1.35 was recovered with 86% yield.

Example 9

|  | Parts |
|---|---|
| Deionized water | 1300 |
| Acrylonitrile | 97 |
| Itaconic acid | 3.0 |
| Sodium hydroxylamine-N-monosulfonate | 1.0 |
| Sodium bisulfite | 3.1 |
| Sulfuric acid | 0.5 |

A mixture of the above ingredients was polymerized at 60° C. for 4 hours as in Example 1 and there was obtained polymer slurry of pH 2.5 from which white polymer of specific viscosity of 1.63 was recovered with 70% yield.

Example 10

|  | Parts |
|---|---|
| Deionized water | 900 |
| Acrylonitrile | 92 |
| Methyl methacrylate | 8 |
| Potassium hydroxylamine-N-monosulfonate | 2.8 |
| Sodium bisulfite | 1.2 |
| Nitric acid | 0.2 |

A mixture of the above ingredients was polymerized at 50° C. and average residence period of time of 6.5 hours as in Example 2. There was obtained polymer slurry of pH 2.4 from which a white polymer of specific viscosity of 1.65 was recovered with 80% yield.

Example 11

|  | Parts |
|---|---|
| Deionized water | 1200 |
| Acrylonitrile | 92 |
| Methyl methacrylate | 8 |
| Ammonium hydroxylamine-N-monosulfonate | 1.0 |
| Sodium bisulfite | 5.2 |
| Sulfuric acid | 0.4 |

A mixture of the above ingredients was polymerized at 60° C. for 4 hours as in Example 1 and there was obtained polymer slurry of pH 2.6 from which white polymer of specific viscosity of 1.63 was recovered with 90% yield.

Example 12

| | Parts |
|---|---|
| Deionized water | 1200 |
| Acrylonitrile | 94 |
| Methyl acrylate | 6 |
| Potassium hydroxylamine-N-monosulfonate | 1.0 |
| Sodium sulfite | 7.3 |
| Sulfuric acid | 3.4 |

A mixture of the above ingredients was polymerized at 60° C. for 4 hours as in Example 1 and there was obtained polymer slurry of pH 2.7 from which white polymer of specific viscosity of 1.58 was recovered with 92% yield.

Example 13

| | Parts |
|---|---|
| Deionized water | 900 |
| Acrylonitrile | 95 |
| Methyl acrylate | 5 |
| Sodium hydroxylamine-N, N-disulfonate | 1.5 |
| Sodium bisulfite | 2.4 |
| Sulfuric acid | 0.3 |

A mixture of the above ingredients was polymerized at 45° C. and average residence period of time of 4 hours as in Example 2, and there was obtained polymer slurry of pH 2.7 from which white polymer of specific viscosity of 1.41 was recovered with 81% yield. The polymer was dissolved at 0° C. in nitric acid of 70% by weight free from nitrous acid to obtain a 26 g./100 cc. solution and then extruded at 0° C. in an aqueous nitric acid solution (30% by weight) at a rate of 5 m./min. The fibers thus obtained were washed with water, stretched 7 times in a hot water of 100° C. and dried at 80° C. to produce fibers of

| | |
|---|---|
| Fineness | d 2.95 |
| Tensile strength | g/d 3.45 |
| Elongation | percent 25 |

The fibers were dipped in an aqueous dye bath containing 0.25% by weight of Severon Green B at bath ratio of 40, at a temperature of 100° C. for one hour and absorbed 45% by weight of the dye per weight of the fiber. The fibers had high whiteness and were hardly coloured after wet heat treatment with 120° C. steam for 10 min.

Example 14

| | Parts |
|---|---|
| Deionized water | 900 |
| Acrylonitrile | 91.6 |
| Methyl acrylate | 8.0 |
| Sodium metaallylsulfonate | 0.4 |
| Sodium hydroxylamine-N, N-disulfonate | 1.5 |
| Sodium bisulfite | 3.2 |
| Sulfuric acid shown in the following table. | |

A mixture of the above ingredients was polymerized at a temperature of 55° C. and average residence period of time of 4 hours. The results were as follows:

| Sulfuric acid (parts) | 0 | 0.02 | 0.19 | 0.50 | 0.82 | 2.76 |
|---|---|---|---|---|---|---|
| pH of polymer slurry | 3.5 | 3.4 | 3.1 | 2.7 | 2.3 | 1.5 |
| Yield (percent) (by weight) | 80 | 83 | 84 | 84 | 83 | 74 |
| Specific viscosity | 1.62 | 1.44 | 1.18 | 1.21 | 1.37 | 2.42 |

Example 15

| | Parts |
|---|---|
| Deionized water | 1200 |
| Acrylonitrile | 92 |
| Methyl acrylate | 8 |
| Potassium hydroxylamine-N, N-disulfonate | 1.8 |
| Sodium metabisulfite | 1.2 |
| Sulfuric acid | 0.6 |

A mixture of the above ingredients was polymerized at 60° C. for 4 hours as in Example 1 and there was obtained polymer slurry of pH 2.6 from which white polymer of specific viscosity of 0.95 was recovered with 95% yield.

Example 16

| | Parts |
|---|---|
| Deionized water | 1200 |
| Acrylonitrile | 94 |
| Methyl acrylate | 6 |
| Ammonium hydroxylamine-N, N-disulfonate | 1.8 |
| Sodium sulfite | 7.3 |
| Sulfuric acid | 3.4 |

A mixture of the above ingredients was polymerized at 60° C. for 4 hours as in Example 1 and there was obtained polymer slurry of pH 2.8 from which white polymer of specific viscosity of 1.62 was recovered with 90% yield.

Example 17

| | Parts |
|---|---|
| Deionized water | 1000 |
| Acrylonitrile | 92 |
| Methyl acrylate | 8 |
| Potassium hydroxylamine-N, N-disulfonate | 1.5 |
| Sodium hyposulfite | 6.7 |
| Sulfuric acid | 2.8 |

A mixture of the above ingredients was polymerized at 55° C. for 6 hours as in Example 1 and there was obtained polymer slurry of pH 2.3 from which white polymer of specific viscosity of 1.44 was recovered with 90% yield.

Example 18

| | Parts |
|---|---|
| Deionized water | 1200 |
| Acrylonitrile | 92 |
| Methyl acrylate | 8 |
| Potassium hydroxylamine- N, N-disulfonate | 1.8 |
| Sulfur dioxide | 3.7 |

A mixture of the above ingredients was polymerized at 60° C. for 4 hours and there was obtained polymer slurry of pH 1.9 from which white polymer of specific viscosity of 2.35 was recovered with 85% yield.

What we claim is:

1. A process for the preparation of acrylonitrile polymer which comprises polymerizing at a temperature of from 40° to 75° C. a member selected from the group consisting of acrylonitrile and a mixture of acrylonitrile with a minor proportion of another monoethylenically unsaturated compound which is copolymerizable with acrylonitrile in an aqueous medium of pH 1.5 to 4.0 said aqueous medium containing (a) a catalytically effective amount of a salt selected from the group consisting of alkali metal salt of hydroxylamine-N-monosulfonic acid, alkali metal salt of hydroxylamine-N,N-disulfonic acid, ammonium salt of hydroxylamine-N-monosulfonic acid and ammonium salt of hydroxylamine-N,N-disulfonic acid; and (b) a catalytically effective amount of a tetravalent sufur-containing inorganic compound selected from the group consisting of sulfur dioxide, sodium bisulfite, potassium bisulfite, ammonium bisulfite, sodium metabisulfite, potassium metabisulfite, ammonium metabisulfite, sodium sulfite, potassium sulfite, ammonium sulfite, sodium hyposulfite potassium hyposulfite and ammonium hyposulfite.

2. A process according to claim 1, wherein the copolymerizable, unsaturated compound is selected from the group consisting of acrylic acid, acrylates, acrylic acid amide, methacrylic acid, methacrylates and methacrylic acid amide.

3. A process according to claim 1, wherein the said salt of hydroxylamine-N-sulfonic acid is used in amount of about 0.1 to 5.0% by weight of the total monomer, and the teravalent sulfur containing inorganic compound is used in amount of about 1.0 to 10.0% by weight of the total monomer.

4. A process for polymerizing acrylonitrile which comprises heating the acrylonitrile monomer in an acidic aqueous medium at a temperature between 40 and 75° C. in the presence of (a) a member selected from the group consisting of an alkali metal salt of hydroxylamine-N-monosulfonic acid, alkali metal salt of hydroxylamine-N,N-disulfonic acid, ammonium salt of hydroxylamine-N-monosulfonic acid and ammonium salt of hydroxylamine-N,N-disulfonic acid; and (b) an inorganic tetravalent sulfur-containing compound selected from the group consisting of sulfur dioxide, alkali metal bisulfite, ammonium bisulfite, alkali metal metasulfite, ammonium metasulfite, alkali metal sulfite, ammonium sulfite, and alkali metal hyposulfite and ammonium hyposulfite; said process being characterized in that the polymerization is carried out at a pH between 1.5 and 4.0 monomer and water being present in a weight ratio of 1:2 to 15, the amount of hydroxylamine-N-sulfonic acid salt used being from 0.1 to 5.0% of the total amount of monomer, and the amount of the tetravalent sulfur-containing compound used being from 1.0 to 10% of the total amount of the monomer.

5. A process for polymerizing acrylonitrile with other monoethylenically unsaturated compounds copolymerizable with acrylonitrile which comprises heating the said monomers in an acidic aqueous medium at a temperature between 40 and 75° C. in the presence of (a) a member selected from the group consisting of an alkali metal salt of hydroxylamine-N-monosulfonic acid, alkali metal salt of hydroxylamine-N,N-disulfonic acid, ammonium salt of hydroxylamine-N-monosulfonic acid and ammonium salt of hydroxylamine-N,N-disulfonic acid; and (b) an inorganic tetravalent sulfur-containing compound selected from the group consisting of sulfur dioxide, alkali metal bisulfite, ammonium bisulfite, alkali metal metasulfite, ammonium metasulfite, alkali metal sulfite, ammonium sufite, alkali metal hyposulfite and ammonium hyposulfite; said process being characterized in that the polymerization is carried out at a pH between 1.5 and 4.0, monomer and water being present in a weight ratio of 1:2 to 15, the amount of hydroxylamine-N-sulfonic acid salt used being from 0.1 to 5.0% of the total amount of monomers, and the amount of the tetravalent sulfur-containing compound used being from 1.0 to 10% of the total amount of monomers.

References Cited by the Examiner
UNITED STATES PATENTS 2,631,997   3/53   Stewart _____ 260—83.1

FOREIGN PATENTS 1,039,749   9/58   Germany.

OTHER REFERENCES

Nast et al.: Chem. Abs., vol. 47 (1953), page 3743d.

LEON J. BERCOVITZ, *Primary Examiner.*

P. E. MANGAN, J. R. LIBERMAN, *Examiners.*